(12) United States Patent
Luttrell

(10) Patent No.: US 8,230,177 B2
(45) Date of Patent: Jul. 24, 2012

(54) STORE PREFETCHING VIA STORE QUEUE LOOKAHEAD

(75) Inventor: Mark A. Luttrell, Cedar Park, TX (US)

(73) Assignee: Oracle America, Inc., Redwood City, CA (US)

( * ) Notice: Subject to any disclaimer, the term of this patent is extended or adjusted under 35 U.S.C. 154(b) by 464 days.

(21) Appl. No.: 12/473,989

(22) Filed: May 28, 2009

(65) Prior Publication Data

US 2010/0306477 A1    Dec. 2, 2010

(51) Int. Cl.
*G06F 12/08* (2006.01)
(52) U.S. Cl. ............... 711/137; 711/141; 711/E12.001; 711/E12.026; 711/E12.057
(58) Field of Classification Search ............... 711/137, 711/141, E12.001, E12.026, E12.057
See application file for complete search history.

(56) References Cited

U.S. PATENT DOCUMENTS

| | | | |
|---|---|---|---|
| 5,809,530 A * | 9/1998 | Samra et al. ............... | 711/140 |
| 6,721,874 B1 | 4/2004 | Le et al. | |
| 6,988,186 B2 | 1/2006 | Eickemeyer et al. | |
| 2008/0209173 A1* | 8/2008 | Evers et al. ............... | 712/207 |
| 2009/0013135 A1 | 1/2009 | Burger et al. | |
| 2010/0199045 A1* | 8/2010 | Bell et al. ............... | 711/137 |
| 2010/0293347 A1 | 11/2010 | Luttrell | |

* cited by examiner

*Primary Examiner* — Hoai V Ho
(74) *Attorney, Agent, or Firm* — Rory D. Rankin; Meyertons, Hood, Kivlin, Kowert & Goetzel, P.C.

(57) ABSTRACT

Systems and methods for efficient handling of store misses. A processor comprises a store queue that stores data for committed store instructions. Coupled to the store queue is a cache responsible for ensuring consistent ordering of store operations for all consumers, which may be accomplished by maintaining a corresponding cache line be in an exclusive state before executing a store operation. In response to a first committed store instruction missing in the cache, the store queue is configured to convey to the cache a second entry of the plurality of queue entries as a speculative prefetch instruction. This second entry corresponds to a committed store instruction that follows in program order the first committed store instruction of a given thread. If the prefetch instruction misses in the cache, the latency for acquiring a corresponding cache line overlaps with the latency of the first store instruction.

20 Claims, 6 Drawing Sheets

STORE PREFETCHING VIA STORE QUEUE LOOKAHEAD

BACKGROUND OF THE INVENTION

1. Field of the Invention

This invention relates to computing systems, and more particularly, to efficient handling of store misses corresponding to multiple threads.

2. Description of the Relevant Art

Modern microprocessors typically buffer retired store instructions that have yet to write data to a memory subsystem. A store queue (SQ) is a hardware structure configured to buffer retired store instructions, or memory write operations. A particular store instruction is generally held in this structure from the point-in-time the store instruction is retired in a pipeline to the point-in-time it is known that the store instruction has been processed by the memory subsystem such that the corresponding data of the store instruction is globally visible to all processors and threads within the system.

Modern multi-core processors typically are coupled to a memory hierarchy including on-chip caches. Each core typically contains a relatively small level 1 (L1) cache in order to maintain access latencies as low as possible. Multiple cores may share one or more larger level 2 or 3 (L2 or L3) caches. Since a die will contain multiple copies of a L1 cache, it is desirable to make the L1 cache as small and simple as possible. One common method for removing complexity from the L1 cache is to make it a write-through cache and to forsake the responsibility of managing memory request ordering and cache coherency issues to higher level (L2 or L3) caches.

A multi-threaded shared memory system may be thought of as a single atomic memory on which multiple apparently sequential threads are operating. An apparently sequential thread is a single thread in isolation, which behaves as if it is running sequentially. This type of execution implies a few constraints such as a store instruction cannot be reordered with respect to another load or store instruction corresponding to a same memory location, or the illusion of sequential execution is removed. Similarly, the dependencies between branches and subsequent stores need to be respected. For example, if branch prediction occurs, it cannot have an observable effect.

In practice, a multi-threaded shared memory system is very complex with a hierarchy of buffers, caches, random-access-memory (RAM), and disks. Memory consistency models attempt to describe and constrain the behavior of these complex systems. Actions on this complex memory system are serializable, or there is a single serial history of all load and store memory instructions. This single serial history is consistent with the execution behavior of each thread, which accounts for the observed behavior of the program. One example of a memory model is Sequential Consistency, see L. Lamport, How to Make a Multiprocessor Computer That Correctly Executes Multiprocess Programs, IEEE Transactions on Computers, September 1979, pp. 690-691. With Sequential Consistency, sequential behavior is enforced by requiring serializations respect the exact order in which operations occurred in the program.

In contrast to Sequential Consistency (SC), more relaxed memory models utilize different rules for instruction reordering, wherein the instructions within a thread may be partially ordered rather than totally ordered as in SC. Examples of more relaxed memory models include the memory models of the PowerPC architecture, see C. May, et al, The PowerPC Architecture: A Specification for A New Family of RISC Processors, Morgan Kaufmann, 1994, and the RMO model for the SPARC architecture, see D. L. Weaver, et al, The SPARC Architecture Manual (Version 9), Prentice-Hall, 1994.

Most memory models have a store atomicity property, and it is this property that is enforced by cache coherence protocols. Store atomicity describes inter-thread communication via memory and describes the ordering constraints, which must exist in serializable models. An example of a memory model that does not obey store atomicity is the Total Store Order (TSO) memory model of the SPARC Architecture. The only reordering permitted in TSO is that a later load instruction may bypass an earlier store instruction. Local load operations are permitted to obtain values from a store operation before it has been committed to memory. The TSO memory model specifies that all stores be performed in a strict order so that within one thread, all stores are performed in program order, and in a symmetric multi-processing (SMP) arrangement, all threads must observe a consistent ordering of stores from other threads.

Regardless of the implemented memory model that provides rules that specify in what order memory operations may be performed relative to program order and relative to other memory operations, there needs to be a point within the memory hierarchy that serves as a reference for all store operations. This point is referred to as a global ordering point. The global ordering point is responsible for ensuring that all consumers will see a consistent and proper ordering of store operations. This is typically accomplished by requiring that a cache line be in an exclusive state of a cache coherency protocol, such as MESI, before executing a store operation.

A problem arises when a cache line being accessed is not in an exclusive state, and, therefore, needs to be acquired. Line acquisition may take a very long time, potentially requiring system level coherence operations and/or fetching data from relatively slow dynamic-random-access-memory (DRAM). In the meantime, since store instructions may need to be executed in program order, any following store instructions are queued while these instructions wait for the previous store instruction to complete. Two problems may occur. First, if a later store instruction also misses, whether the cache line is actually missing from the cache or the store instruction accesses a cache line not in an exclusive state, then the long latencies become serialized, which leads to very long execution times.

Second, queuing many later store instructions, which includes respective addresses, data, and control and status information, can be expensive. Both on-chip real estate is consumed and access times increase with increasing size of such a queue. For example, searches in the queue may be implemented by circuitry for a content-addressable-memory (CAM) comparison of address and valid status information of all entries within the queue. Circuitry for CAM match comparisons typically utilize dynamic logic that consume a relatively high amount of power. An access time of an array utilizing CAM comparison circuitry may be a factor in determining a processor's clock cycle duration. Therefore, the size of the queue has an upper limit based on both timing requirements and power consumption. These caveats are experienced especially in the case a cache, such as a L2 cache, is shared by multiple cores and/or threads. These queues need to have a finite and manageable size.

However, filling these queues results in the shared cache rejecting new requests. Data collected from various benchmarks show that store instruction misses, as described above, are relatively uncommon. Therefore, additional store instruction misses occurring while a first one is pending would be more rare. However, such a situation may still occur, and one occurrence complete with very long serialized latencies may result in the store instruction miss queues, or miss buffers, filling up. Filled miss buffers cause the processor core store queue to also fill up. This event causes the processor execution to halt, which needs to be avoided.

In view of the above, efficient methods and mechanisms for efficient handling of store misses corresponding to multiple threads are desired.

SUMMARY OF THE INVENTION

Systems and methods for efficient handling of store misses corresponding to multiple threads are contemplated. In one embodiment, a processor comprises a store queue that includes an array comprising a plurality of queue entries, wherein each queue entry is configured to store data for a committed store instruction. Coupled to the store queue is a cache used as a global ordering point for a memory model. This cache may be responsible for ensuring that all consumers experience a consistent and proper ordering of store operations, which may be accomplished by detecting a corresponding cache line be in an exclusive state before executing a store operation. Otherwise, a cache miss occurs.

This cache conveys information of a missed request, which misses in the cache, to higher level memory in a memory hierarchy in order to service the missed request. In response to a first committed store instruction missed in the cache, the store queue is configured to convey to the cache a second entry of the plurality of queue entries as a speculative prefetch instruction. This second entry corresponds to a second committed store instruction in program order following the first committed store instruction of a given thread.

These and other embodiments will become apparent upon reference to the following description and accompanying drawings.

Figure 1:
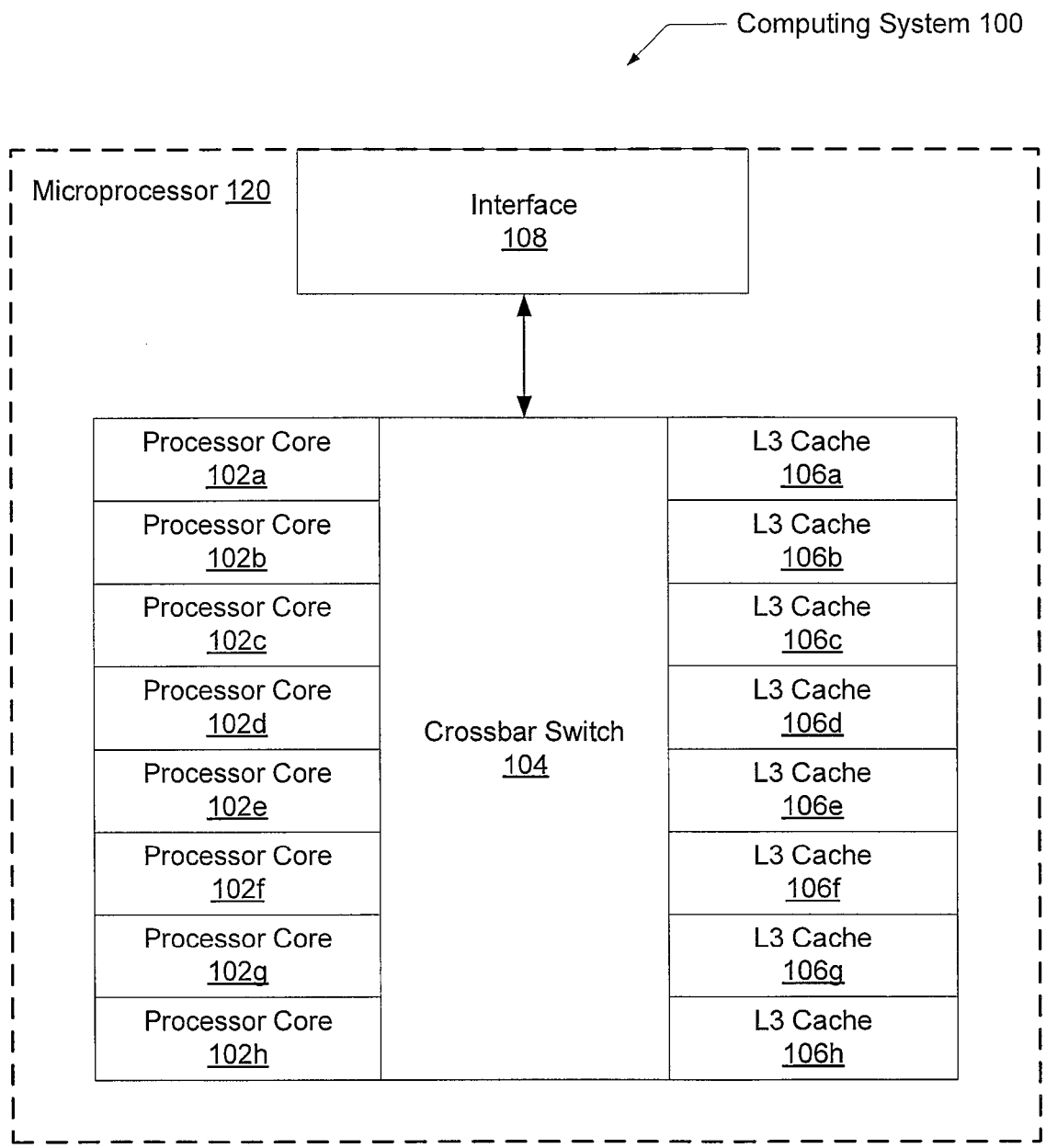
FIG. 1 is a generalized block diagram illustrating one embodiment of a computing system with a multi-threaded microprocessor.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

In the following description, numerous specific details are set forth to provide a thorough understanding of the present invention. However, one having ordinary skill in the art should recognize that the invention may be practiced without these specific details. In some instances, well-known circuits, structures, signals, computer program instruction, and techniques have not been shown in detail to avoid obscuring the present invention.

Referring to FIG. 1, one embodiment of a computing system 100 with a microprocessor 120 comprising multiple instantiated cores 102a-102h is shown. In one embodiment, microprocessor 120 may be a standalone processor within a mobile laptop system, a desktop, an entry-level server system, a mid-range workstation, or other. For such an embodiment, microprocessor 120 may internally utilize a system bus controller for communication, which may be integrated in crossbar switch 104 or it may be a separate design. A system bus controller may couple microprocessor 120 to outside memory, input/output (I/O) devices such as computer peripherals, a graphics processing unit (GPU), or other. In such an embodiment, logic within such a system bus controller may replace or incorporate the functionality of a memory controller and interface logic 108.

In another embodiment, microprocessor 120 may be included in multiple processing nodes of a multi-socket system, wherein each node utilizes a packet-based link for inter-node communication. In addition to coupling processor cores 102a-102h to L3 caches 106a-106h, crossbar switch 104 may incorporate packet processing logic. Generally speaking, such logic may be configured to respond to control packets received on outside links to which microprocessor 120 may be coupled, to generate control packets in response to processor cores 102a-102h and/or cache memory subsystems, to generate probe commands and response packets in response to transactions selected by interface logic 108 for service, and to route packets for which microprocessor 120 may be included in a node that is an intermediate node to other nodes through interface logic 108. Interface logic 108 may include logic to receive packets and synchronize the packets to an internal clock used by packet processing logic.

As used herein, elements referred to by a reference numeral followed by a letter may be collectively referred to by the numeral alone. For example, processor cores 102a-102h may be collectively referred to as processor cores, or cores, 102. In one embodiment, microprocessor 120 has eight instantiations of a processor core 102. Each processor core 102 may utilize conventional processor design techniques such as complex branch prediction schemes, out-of-order execution, and register renaming techniques.

Each core 102 may include circuitry for executing instructions according to a predefined instruction set. For example, the SPARC instruction set architecture (ISA) may be selected. Alternatively, the x86, x86-64, Alpha, PowerPC, MIPS, PA-RISC, or any other instruction set architecture may be selected. Generally, processor core 102 may access a cache memory subsystem for data and instructions. Each core 102 may contain its own level 1 (L1) and level 2 (L2) caches in order to reduce memory latency. These cache memories may be integrated within respective processor cores 102. Alternatively, these cache memories may be coupled to processor cores 102 in a backside cache configuration or an inline configuration, as desired.

The L1 cache may be located nearer a processor core 102 both physically and within the cache memory hierarchy. Crossbar switch 104 may provide communication between the cores 102 and L3 caches 106. In one embodiment, crossbar switch 104 may include logic, such as multiplexers or a switch fabric, that allows any L2 cache to access any bank of L3 cache 106, and that conversely allows data to be returned from any L3 bank to any L2 cache. Additionally, in one embodiment, crossbar switch 104 may be configured to arbitrate conflicts that may occur when multiple L2 caches attempt to access a single bank of L3 cache 106, or vice versa.

In addition, cores 102 may be coupled to double data rate dual in-line memory modules (DDR DIMM) that reside on a circuit board outside microprocessor 120. In one embodiment, DDR DIMM channel(s) may be on-chip in order to couple the cores 102 to the DDR DIMM off-chip. Each L3 cache 106 may be coupled to a memory controller or a dynamic random access memory (DRAM) channel for communication to DRAM that resides off-chip. Also, an interface to a system bus may be coupled to the each L3 cache 106.

In one embodiment, each processor core 102 may support execution of multiple threads. Multiple instantiations of a same processor core 102 that is able to concurrently execute multiple threads may provide high throughput execution of server applications while maintaining power and area savings. A given thread may include a set of instructions that may execute independently of instructions from another thread. For example, an individual software process either within a software application, may consist of one or more threads that may be scheduled for execution by an operating system. Such a core 102 may also be referred to as a multithreaded (MT) core. In one embodiment, each of the cores 102 may be configured to concurrently execute instructions from a variable number of threads, such as up to eight concurrently executing threads. In an 8-core implementation, microprocessor 120 could thus concurrently execute up to 64 threads.

In one embodiment, each of cores 102 may be configured for multithreaded, out-of-order execution. More specifically, in one embodiment, each of cores 102 may be configured to perform dynamic multithreading. Generally speaking, under dynamic multithreading, the execution resources of cores 102 may be configured to efficiently process varying types of computational workloads that exhibit different performance characteristics and resource requirements. Such workloads may vary across a continuum that emphasizes different combinations of individual-thread and multiple-thread performance.

At one end of the continuum, a computational workload may include a number of independent tasks, where completing the aggregate set of tasks within certain performance criteria (e.g., an overall number of tasks per second) is a more significant factor in system performance than the rate at which any particular task is completed. For example, in certain types of server or transaction processing environments, there may be a high volume of individual client or customer requests (such as web page requests or file system accesses). In this context, individual requests may not be particularly sensitive to processor performance. For example, requests may be input/output (I/O)-bound rather than processor-bound—completion of an individual request may need I/O accesses (e.g., to relatively slow memory, network, or storage devices) that dominate the overall time needed to complete the request, relative to the processor effort involved. Thus, a processor that is capable of concurrently processing many such tasks (e.g., as independently executing threads) may exhibit better performance on such a workload than a processor that emphasizes the performance of only one or a small number of concurrent tasks.

At the other end of the continuum, a computational workload may include individual tasks whose performance is highly processor-sensitive. For example, a task that involves significant mathematical analysis and/or transformation (e.g., cryptography, graphics processing, scientific computing) may be more processor-bound than I/O-bound. Such tasks may benefit from processors that emphasize single-task performance, for example through speculative execution and exploitation of instruction-level parallelism.

Dynamic multithreading represents an attempt to dynamically allocate processor resources in a manner that flexibly adapts to workloads that vary along the continuum described above. In one embodiment, cores 102 may be configured to implement fine-grained multithreading, in which each core may select instructions to execute from among a pool of instructions corresponding to multiple threads, such that instructions from different threads may be scheduled to execute adjacently. For example, in a pipelined embodiment of core 102 employing fine-grained multithreading, instructions from different threads may occupy adjacent pipeline stages, such that instructions from several threads may be in various stages of execution during a given core processing cycle. Through the use of fine-grained multithreading, cores 102 may be configured to efficiently process workloads that depend more on concurrent thread processing than individual thread performance.

In one embodiment, cores 102 may also be configured to implement out-of-order processing, speculative execution, register renaming and/or other features that improve the performance of processor-dependent workloads. Moreover, cores 102 may be configured to dynamically allocate a variety of hardware resources among the threads that are actively executing at a given time, such that if fewer threads are executing, each individual thread may be able to take advantage of a greater share of the available hardware resources. This may result in increased individual thread performance when fewer threads are executing, while retaining the flexibility to support workloads that exhibit a greater number of threads that are less processor-dependent in their performance. In various embodiments, the resources of a given core 102 that may be dynamically allocated among a varying number of threads may include branch resources (e.g., branch predictor structures), load/store resources (e.g., load/store buffers and queues), instruction completion resources (e.g., reorder buffer structures and commit logic), instruction issue resources (e.g., instruction selection and scheduling structures), register rename resources (e.g., register mapping tables), and/or memory management unit resources (e.g., translation lookaside buffers, page walk resources).

Figure 2:
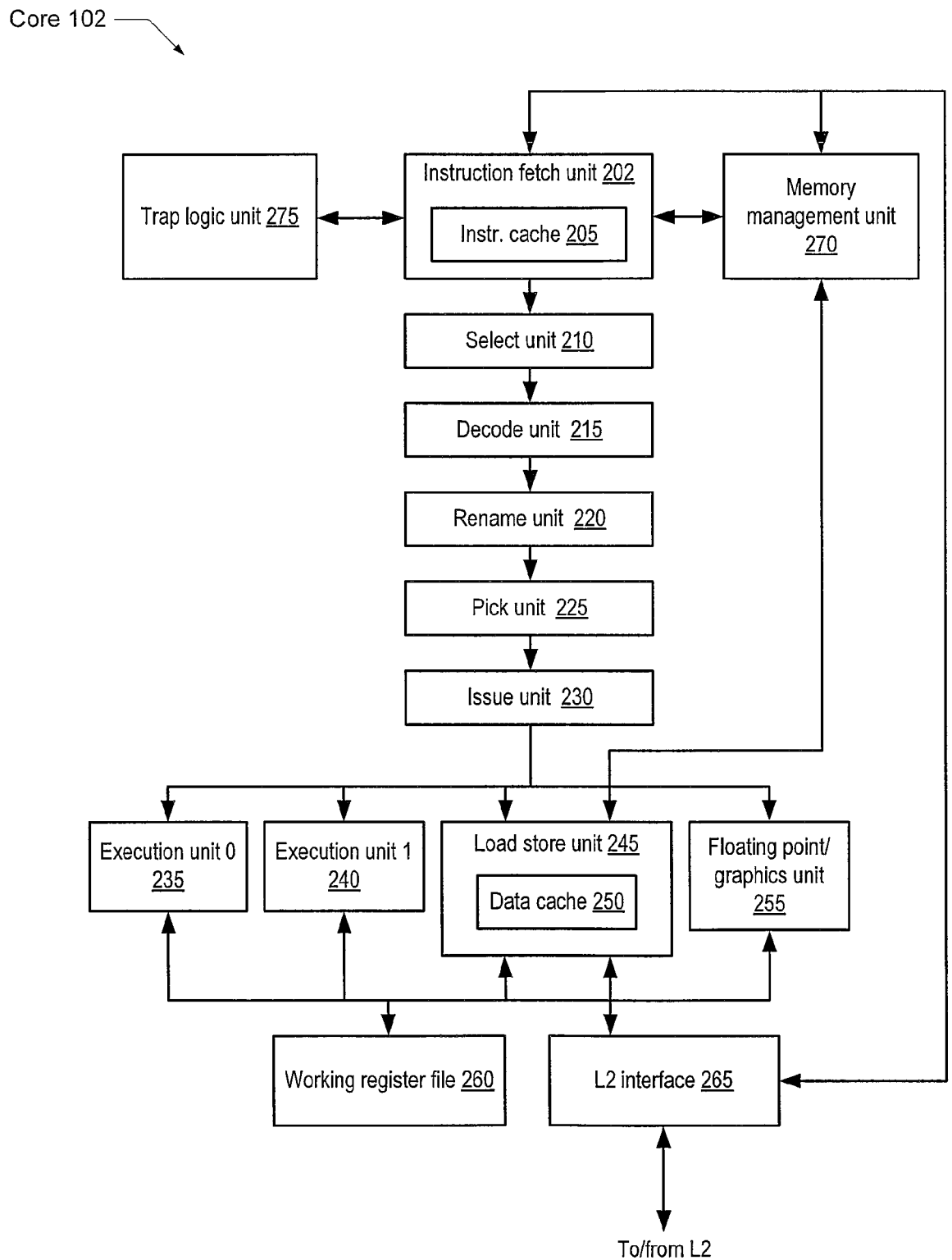
FIG. 2 is a generalized block diagram illustrating one embodiment of a processor core configured to perform dynamic multithreading.

One embodiment of core 102 that is configured to perform dynamic multithreading is illustrated in FIG. 2. In the illustrated embodiment, core 102 includes an instruction fetch unit (IFU) 202 that includes an L1 instruction cache 205. IFU 202 is coupled to a memory management unit (MMU) 270, L2 interface 265, and trap logic unit (TLU) 275. IFU 202 is additionally coupled to an instruction processing pipeline that begins with a select unit 210 and proceeds in turn through a decode unit 215, a rename unit 220, a pick unit 225, and an issue unit 230. Issue unit 230 is coupled to issue instructions to any of a number of instruction execution resources: an execution unit 0 (EXU0) 235, an execution unit 1 (EXU1) 240, a load store unit (LSU) 245 that includes a L1 data cache 250, and/or a floating point/graphics unit (FGU) 255. These instruction execution resources are coupled to a working register file 260. Additionally, LSU 245 is coupled to L2 interface 265 and MMU 270.

In the following discussion, exemplary embodiments of each of the structures of the illustrated embodiment of core 102 are described. However, it is noted that the illustrated partitioning of resources is merely one example of how core 102 may be implemented. Alternative configurations and variations are possible and contemplated.

Instruction fetch unit (IFU) 202 may be configured to provide instructions to the rest of core 102 for execution. In one embodiment, IFU 202 may be configured to select a thread to be fetched, fetch instructions from instruction cache 205 for the selected thread and buffer them for downstream processing, request data from L2 cache 105 in response to instruction cache misses, and predict the direction and target of control transfer instructions (e.g., branches). In some embodiments, IFU 202 may include a number of data structures in addition to instruction cache 205, such as an instruction translation lookaside buffer (ITLB), instruction buffers, and/or structures configured to store state that is relevant to thread selection and processing.

In one embodiment, virtual to physical address translation may occur by mapping a virtual page number to a particular physical page number, leaving the page offset unmodified. Such translation mappings may be stored in an ITLB or a DTLB for rapid translation of virtual addresses during lookup of instruction cache 205 or data cache 250. In the event no translation for a given virtual page number is found in the appropriate TLB, memory management unit 270 may be configured to provide a translation. In one embodiment, MMU 270 may be configured to manage one or more translation tables stored in system memory and to traverse such tables (which in some embodiments may be hierarchically organized) in response to a request for an address translation, such as from an ITLB or DTLB miss. (Such a traversal may also be referred to as a page table walk or a hardware table walk.) In some embodiments, if MMU 270 is unable to derive a valid address translation, for example if one of the memory pages including a necessary page table is not resident in physical memory (i.e., a page miss), MMU 270 may be configured to generate a trap to allow a memory management software routine to handle the translation.

During the course of operation of some embodiments of core 100, exceptional events may occur. For example, an instruction from a given thread that is selected for execution by select unit 210 may not be a valid instruction for the ISA implemented by core 100 (e.g., the instruction may have an illegal opcode), a floating-point instruction may produce a result that needs further processing in software, MMU 270 may not be able to complete a page table walk due to a page miss, a hardware error (such as uncorrectable data corruption in a cache or register file) may be detected, or any of numerous other possible architecturally-defined or implementation-specific exceptional events may occur.

In one embodiment, trap logic unit 275 may be configured to manage the handling of such events. For example, TLU 275 may be configured to receive notification of an exceptional event occurring during execution of a particular thread, and to cause execution control of that thread to vector to a supervisor-mode software handler (i.e., a trap handler) corresponding to the detected event. Such handlers may include, for example, an illegal opcode trap handler configured to return an error status indication to an application associated with the trapping thread and possibly terminate the application, a floating-point trap handler configured to fix up an inexact result, etc. In one embodiment, TLU 275 may be configured to flush all instructions from the trapping thread from any stage of processing within core 100, without disrupting the execution of other, non-trapping threads.

In the illustrated embodiment, L2 interface 265 may be configured to provide a centralized interface to the L2 cache associated with a particular core 102, on behalf of the various functional units that may generate L2 accesses. In one embodiment, L2 interface 265 may be configured to maintain queues of pending L2 requests and to arbitrate among pending requests to determine which request or requests may be conveyed to L2 cache during a given execution cycle.

In one embodiment, during each execution cycle of core 102, IFU 202 may be configured to select one thread that will enter the IFU processing pipeline. Thread selection may take into account a variety of factors and conditions, some thread-specific and others IFU-specific. For example, certain instruction cache activities (e.g., cache fill), i-TLB activities, or diagnostic activities may inhibit thread selection if these activities are occurring during a given execution cycle. Additionally, individual threads may be in specific states of readiness that affect their eligibility for selection. For example, a thread for which there is an outstanding instruction cache miss may not be eligible for selection until the miss is resolved.

In some embodiments, those threads that are eligible to participate in thread selection may be divided into groups by priority, for example depending on the state of the thread or of the ability of the IFU pipeline to process the thread. In such embodiments, multiple levels of arbitration may be employed to perform thread selection: selection occurs first by group priority, and then within the selected group according to a suitable arbitration algorithm (e.g., a least-recently-fetched algorithm). However, it is noted that any suitable scheme for thread selection may be employed, including arbitration schemes that are more complex or simpler than those mentioned here.

Once a thread has been selected for fetching by IFU 202, instructions may actually be fetched for the selected thread. To perform the fetch, in one embodiment, IFU 202 may be configured to generate a fetch address to be supplied to instruction cache 205. In various embodiments, the fetch address may be generated as a function of a program counter associated with the selected thread, a predicted branch target address, or an address supplied in some other manner (e.g., through a test or diagnostic mode). The generated fetch address may then be applied to instruction cache 205 to determine whether there is a cache hit.

In some embodiments, accessing instruction cache 205 may include performing fetch address translation (e.g., in the case of a physically indexed and/or tagged cache), accessing a cache tag array, and comparing a retrieved cache tag to a requested tag to determine cache hit status. If there is a cache hit, IFU 202 may store the retrieved instructions within buffers for use by later stages of the instruction pipeline. If there is a cache miss, IFU 202 may coordinate retrieval of the missing cache data from L2 cache 105. In some embodiments, IFU 202 may also be configured to prefetch instructions into instruction cache 205 before the instructions are actually requested to be fetched.

In many ISAs, instruction execution proceeds sequentially according to instruction addresses (e.g., as reflected by one or more program counters). However, control transfer instructions (CTIs) such as branches, call/return instructions, or other types of instructions may cause the transfer of execution from a current fetch address to a nonsequential address. As mentioned above, IFU 202 may be configured to predict the direction and target of CTIs (or, in some embodiments, a subset of the CTIs that are defined for an ISA) in order to reduce the delays incurred by waiting until the effect of a CTI is known with certainty.

Through the operations discussed above, IFU 202 may be configured to fetch and maintain a buffered pool of instructions from one or multiple threads, to be fed into the remainder of the instruction pipeline for execution. Generally speaking, select unit 210 may be configured to select and schedule threads for execution. In one embodiment, during any given execution cycle of core 102, select unit 210 may be configured to select up to one ready thread out of the maximum number of threads concurrently supported by core 102 (e.g., 8 threads), and may select up to two instructions from the selected thread for decoding by decode unit 215, although in other embodiments, a differing number of threads and instructions may be selected. In various embodiments, different conditions may affect whether a thread is ready for selection by select unit 210, such as branch mispredictions, unavailable instructions, or other conditions. To ensure fairness in thread selection, some embodiments of select unit 210 may employ arbitration among ready threads (e.g. a least-recently-used algorithm).

The particular instructions that are selected for decode by select unit 210 may be subject to the decode restrictions of decode unit 215; thus, in any given cycle, fewer than the maximum possible number of instructions may be selected. Additionally, in some embodiments, select unit 210 may be configured to allocate certain execution resources of core 102 to the selected instructions, so that the allocated resources will not be used for the benefit of another instruction until they are released. For example, select unit 210 may allocate resource tags for entries of a reorder buffer, load/store buffers, or other downstream resources that may be utilized during instruction execution.

Generally, decode unit 215 may be configured to prepare the instructions selected by select unit 210 for further processing. Decode unit 215 may be configured to identify the particular nature of an instruction (e.g., as specified by its opcode) and to determine the source and sink (i.e., destination) registers encoded in an instruction, if any. In some embodiments, decode unit 215 may be configured to detect certain dependencies among instructions, to remap architectural registers to a flat register space, and/or to convert certain complex instructions to two or more simpler instructions for execution. Additionally, in some embodiments, decode unit 215 may be configured to assign instructions to slots for subsequent scheduling. In one embodiment, two slots 0-1 may be defined, where slot 0 includes instructions executable in load/store unit 245 or execution units 235-240, and where slot 1 includes instructions executable in execution units 235-240, floating point/graphics unit 255, and any branch instructions. However, in other embodiments, other numbers of slots and types of slot assignments may be employed, or slots may be omitted entirely.

Register renaming may facilitate the elimination of certain dependencies between instructions (e.g., write-after-read or "false" dependencies), which may in turn prevent unnecessary serialization of instruction execution. In one embodiment, rename unit 220 may be configured to rename the logical (i.e., architected) destination registers specified by instructions by mapping them to a physical register space, resolving false dependencies in the process. In some embodiments, rename unit 220 may maintain mapping tables that reflect the relationship between logical registers and the physical registers to which they are mapped.

Once decoded and renamed, instructions may be ready to be scheduled for execution. In the illustrated embodiment, pick unit 225 may be configured to pick instructions that are ready for execution and send the picked instructions to issue unit 230. In one embodiment, pick unit 225 may be configured to maintain a pick queue that stores a number of decoded and renamed instructions as well as information about the relative age and status of the stored instructions. During each execution cycle, this embodiment of pick unit 225 may pick up to one instruction per slot. For example, taking instruction dependency and age information into account, for a given slot, pick unit 225 may be configured to pick the oldest instruction for the given slot that is ready to execute.

In some embodiments, pick unit 225 may be configured to support load/store speculation by retaining speculative load/store instructions (and, in some instances, their dependent instructions) after they have been picked. This may facilitate replaying of instructions in the event of load/store misspeculation. Additionally, in some embodiments, pick unit 225 may be configured to deliberately insert "holes" into the pipeline through the use of stalls, e.g., in order to manage downstream pipeline hazards such as synchronization of certain load/store or long-latency FGU instructions.

Issue unit 230 may be configured to provide instruction sources and data to the various execution units for picked instructions. In one embodiment, issue unit 230 may be configured to read source operands from the appropriate source, which may vary depending upon the state of the pipeline. For example, if a source operand depends on a prior instruction that is still in the execution pipeline, the operand may be bypassed directly from the appropriate execution unit result bus. Results may also be sourced from register files representing architectural (i.e., user-visible) as well as non-architectural state. In the illustrated embodiment, core 102 includes a working register file 260 that may be configured to store instruction results (e.g., integer results, floating point results, and/or condition code results) that have not yet been committed to architectural state, and which may serve as the source for certain operands. The various execution units may also maintain architectural integer, floating-point, and condition code state from which operands may be sourced.

Instructions issued from issue unit 230 may proceed to one or more of the illustrated execution units for execution. In one embodiment, each of EXU0 235 and EXU1 240 may be similarly or identically configured to execute certain integer-type instructions defined in the implemented ISA, such as arithmetic, logical, and shift instructions. In the illustrated embodiment, EXU0 235 may be configured to execute integer instructions issued from slot 0, and may also perform address calculation and for load/store instructions executed by LSU 245. EXU1 240 may be configured to execute integer instructions issued from slot 1, as well as branch instructions. In one embodiment, FGU instructions and multi-cycle integer instructions may be processed as slot 1 instructions that pass through the EXU1 240 pipeline, although some of these instructions may actually execute in other functional units.

In some embodiments, architectural and non-architectural register files may be physically implemented within or near execution units 235-240. It is contemplated that in some embodiments, core 100 may include more or fewer than two integer execution units, and the execution units may or may not be symmetric in functionality. Also, in some embodiments execution units 235-240 may not be bound to specific issue slots, or may be differently bound than just described.

Floating point/graphics unit 255 may be configured to execute and provide results for certain floating-point and graphics-oriented instructions defined in the implemented ISA. For example, in one embodiment FGU 255 may implement single- and double-precision floating-point arithmetic instructions compliant with the IEEE 754-1985 floating-point standard.

Load store unit 245 may be configured to process data memory references, such as integer and floating-point load and store instructions and other types of memory reference instructions. LSU 245 may include a data cache 250 as well as logic configured to detect data cache misses and to responsively request data from L2 cache 105. In one embodiment, data cache 250 may be configured as a set-associative, write-through cache in which all stores are written to L2 cache 105 regardless of whether they hit in data cache 250. As noted above, the actual computation of addresses for load/store instructions may take place within one of the integer execution units, though in other embodiments, LSU 245 may implement dedicated address generation logic. In some embodiments, LSU 245 may implement an adaptive, history-dependent hardware prefetcher configured to predict and prefetch data that is likely to be used in the future, in order to increase the likelihood that such data will be resident in data cache 250 when it is needed.

In various embodiments, LSU 245 may implement a variety of structures configured to facilitate memory operations. For example, LSU 245 may implement a data TLB to cache virtual data address translations, as well as load and store buffers configured to store issued but not-yet-committed load and store instructions for the purposes of coherency snooping and dependency checking. LSU 245 may include a miss buffer configured to store outstanding loads and stores that cannot yet complete, for example due to cache misses. In one embodiment, LSU 245 may implement a store queue configured to store address and data information for stores that have committed, in order to facilitate load dependency checking. LSU 245 may also include hardware configured to support atomic load-store instructions, memory-related exception detection, and read and write access to special-purpose registers (e.g., control registers).

Figure 3:
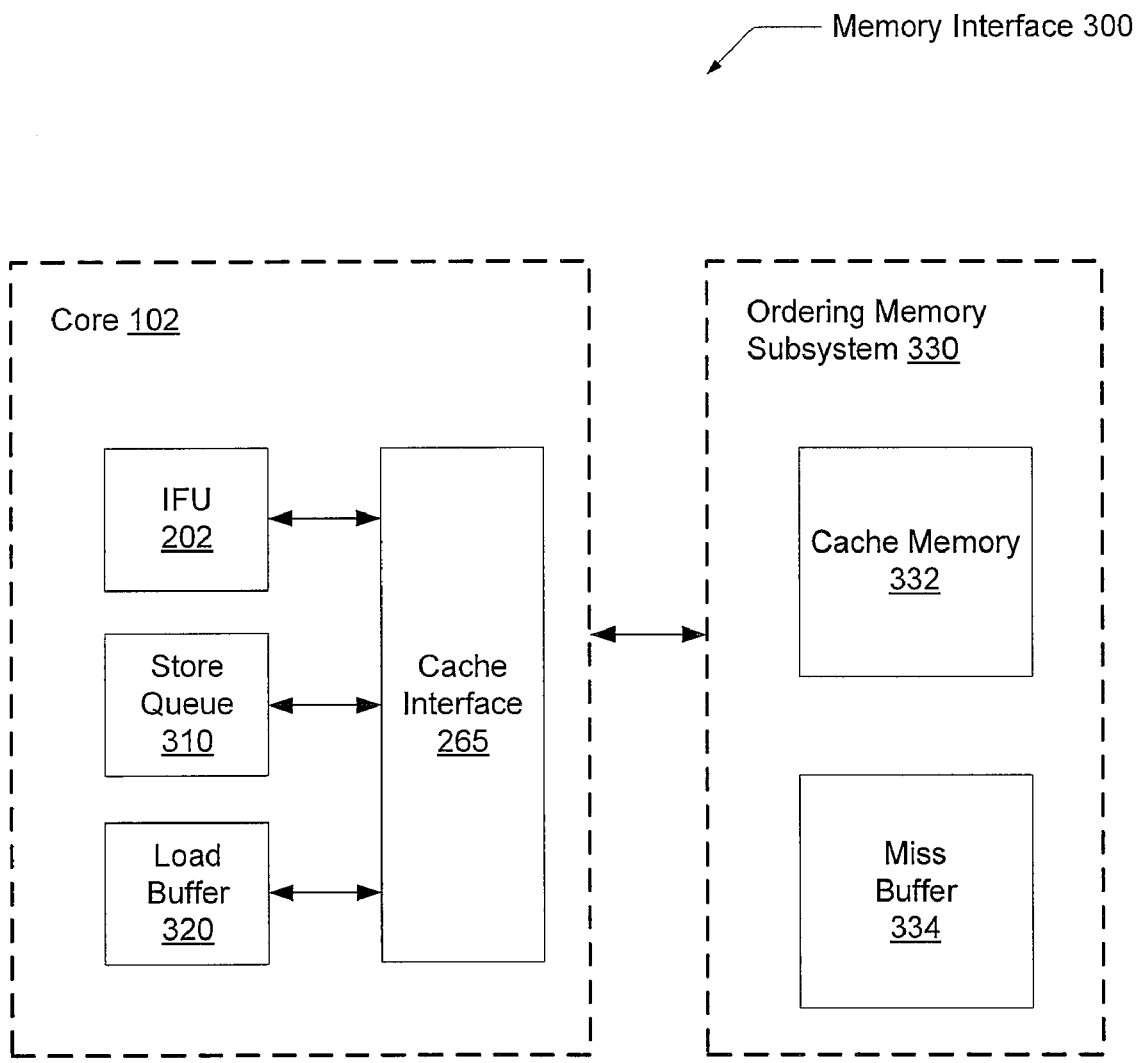
FIG. 3 is a generalized block diagram illustrating one embodiment of a memory interface.

Referring now to FIG. 3, one embodiment of a memory interface 300 illustrating different sources of memory requests is shown. It is noted the components shown in FIG. 3 illustrate a general organization and coupling of components, rather than an actual physical placement of the components. Circuitry and logic used in FIG. 2 and used in FIG. 3 are numbered accordingly. Examples of physical placements may be found in FIG. 1 and FIG. 2. In one embodiment, an ordering memory subsystem 330 used for a global ordering point in a memory model comprises a cache memory 332 that may correspond to an on-core L2 cache of a computing system with an accompanying miss buffer 334.

Cache memory 332 within memory subsystem 330 may be larger than a previous level of memory in the hierarchy, such as an L1 cache in core 102. Cache memory 332 may contain all of the cache lines of a previous level. In one embodiment, in order to remove complexity from a L1 cache, the L1 cache is implemented as a write-through cache and an L2 cache manages memory ordering and coherency issues. Therefore, memory requests within core 102 are sent to both a L1 cache and a L2 cache, such as cache memory 332.

Memory requests may originate at least from the IFU 202, a store queue 310, and a load buffer 320. As described above, IFU 202 may be configured to select a thread to be fetched and to fetch instructions from i-cache 205 for the selected thread, which may correspond to an L1 cache with a corresponding L2 cache memory 332 in FIG. 3. Store queue 310 may be configured to convey memory requests to the same L1 and L2 caches for chosen threads in order to write-out data of committed store instructions for a chosen thread. Load buffer 320 may be configured to convey memory requests to the same L1 and L2 caches for a chosen thread in order to read data of load instructions being executed. Therefore, in one embodiment, at least these three sources, IFU 202, store queue 310, and load buffer 320, on the processor core 102 compete for access to an L2 cache memory 332 via a cache interface 265.

In one embodiment, the miss buffer 334 comprises a plurality of entries that queues all read and write operations, such as load, fetch, and store instructions, which encounter conditions which prevent them from completing. For example, a requested cache line may not be present in cache memory 332. Alternatively, a requested cache line may be present in cache memory, but it does not have a particular cache coherency state. For example, cache memory 332 may be chosen to be a global ordering point for a memory model. In order to adhere to the rules of a memory model, there may need to be a global ordering point within the memory hierarchy, such as cache memory 332 that may be a L2 cache with an associated write-through L1 cache, that serves as the reference for all store operations. This global ordering point may be responsible for ensuring that all consumers will see a consistent and proper ordering of store operations. This is typically accomplished by requiring that a cache line be in an exclusive state before executing a store operation. If a cache line is not in an exclusive state, a cache miss occurs and an updated corresponding cache line may need to be acquired.

Data collected from various benchmarks shows that these types of store misses may be relatively uncommon. Therefore it may be implied that an occurrence of a second or additional cache misses corresponding to store instructions while a first store instruction is pending may be further uncommon. However, such an occurrence will occur occasionally and since the latencies involved are so long, serialization of these latencies may cause the miss buffer 334 to become full. When the miss buffer 334 becomes full, later it is possible the store queue 310 becomes full, which causes processor core 102 to halt execution. In addition, when the miss buffer 334 becomes full, the cache memory 332 will stop accepting requests, including load and IFU requests which tend to be more critical than stores.

Cache memory 332 may service both non-speculative requests and speculative requests. One type of speculative request is a prefetch instruction. A prefetch instruction may be intended to bring data into cache memory 332 prior to when the data is actually needed, which may reduce a latency associated with memory accesses. Since prefetch instructions are speculative, their execution may not be required, which provides flexibility in cache memory 332. For example, when cache memory 332 determines it is too heavily utilized, cache memory 332 may ignore, discard, or drop requests from speculative prefetch instructions. In addition, a prefetch instruction does not need to be ordered with respect to other instructions. Therefore, if a prefetch instruction hits in the cache memory 332, the prefetch instruction may be dropped and it does not have to be queued.

In another embodiment, a global ordering point may be chosen to include an off-core L3 cache 106 shared by multiple cores 102. In such an embodiment, an access latency for the L3 cache may be greater than an access latency for an on-core L2 cache. In addition, a corresponding miss buffer for the L3 cache 106 may become full faster than a miss buffer for an L2 cache. However, management of the entries and corresponding misses for the threads of multiple cores may be more efficient. Further details are provided below.

Figure 4:
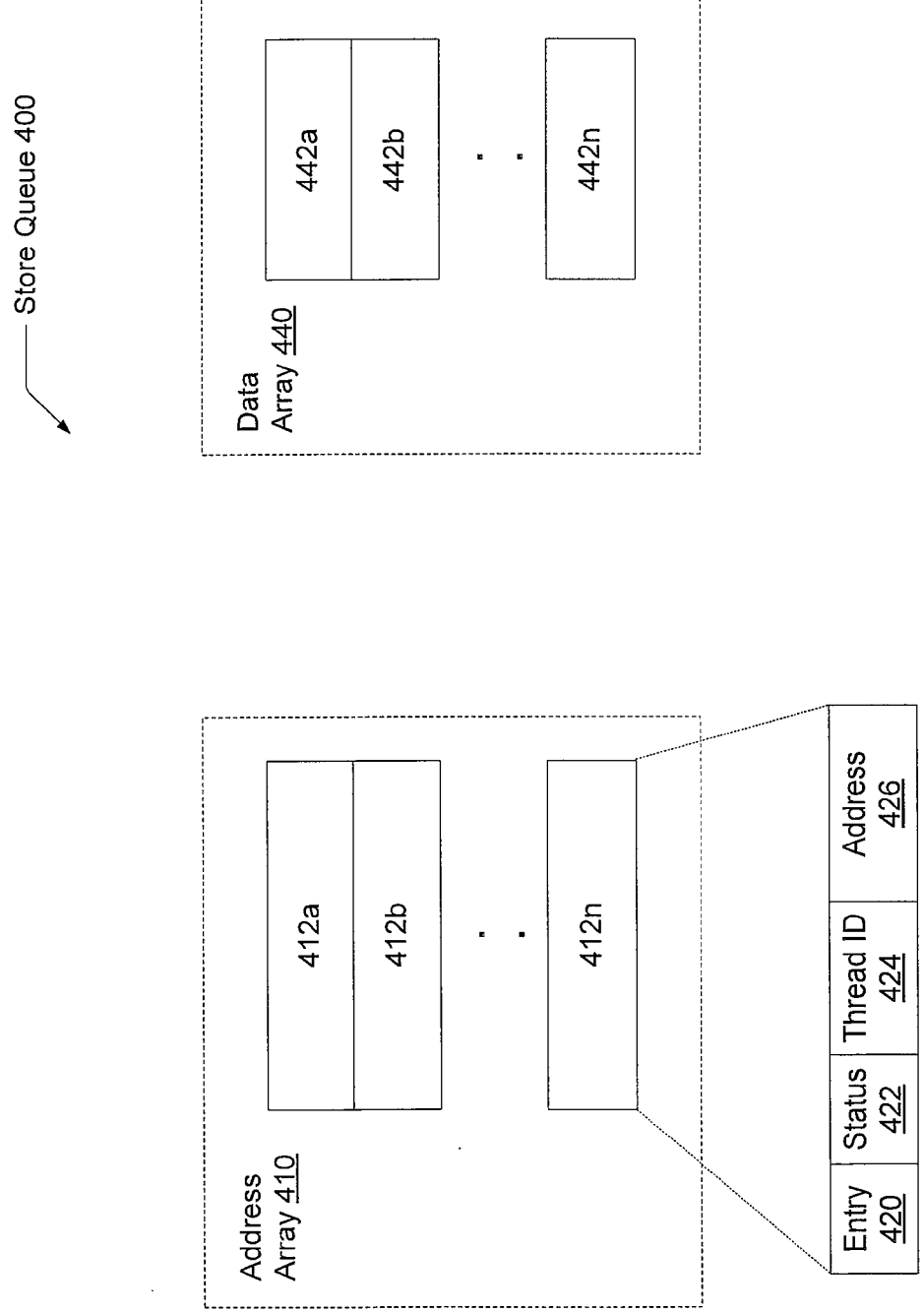
FIG. 4 is a generalized block diagram illustrating one embodiment of the entries of a store queue.

Turning now to FIG. 4, one embodiment of a store queue 400 configured to hold committed store instructions is shown. In one embodiment, a store queue (SQ) 400 holds all committed store instructions or operations of all threads in processor core 102. The buffered store operations may also be micro-operations, or micro-ops, if core 102 is configured to divide instructions into two or more operations. The store queue 400 may have two main components, such as the address array 410 and the data array 440.

The address array 410 may be used for read-after-write (RAW) hazard checking as all load instructions, or operations, may need to check the store queue 400 for RAW hazards prior to being issued. The data array 440 holds the data of committed store instructions until these instructions write-out data to memory subsystem 330 and the corresponding data of the store instruction are now globally visible to all processors and threads within a computing system. A single entry of the store queue 400 may comprise corresponding entries in each of address array 410 and data array 440. For example, a first entry in the store queue 400 may comprise entries 412a and 442a. A second entry in the store queue 400 may comprise entries 412b and 442b, and so forth. For a particular load instruction, when a RAW hazard is detected in the store queue for a particular entry, which has valid data, bypass may occur immediately.

The address array 410 comprises a plurality of entries 412, wherein each entry 412 corresponds to a store instruction, and includes, in one embodiment, an entry number 420, status information 422, a thread identification (TID) number 424, and address 426. Although the fields are shown in this particular order, other combinations are possible and additional fields may be utilized. The bits storing information for the fields 420-428 may or may not be contiguous. Similarly, the arrangement of address array 410 and data array 440 may use other placements for better design trade-offs. The entry number 420 corresponds to the position of an entry in the store queue 400, wherein entry 0 may be configured to be at the top of address array 410 or at the bottom depending on logic preferences. The entry field 420 may be implied rather than an actual stored number. A resource tag, or store queue tag, corresponding to a single store instruction in the processor core 102 pipeline may be also held per entry in address array 410.

Status information 422 may comprise one or more valid bits and cache line MESI protocol information associated with corresponding data stored in the data array 440. A thread identifier (TID) 424 may be used to identify a corresponding thread for a particular store operation when store queue 400 is located within a processor core 102 configured to concurrently execute multiple threads.

In one embodiment, the address field 426 may hold a physical address and a byte mask. Entries may be written upon the retirement of a store instruction. Load instructions may initiate a content-addressable-memory (CAM) comparison operation, typically implemented via dynamic circuit logic, in order to check for an address overlap. In one embodiment, an address overlap occurs when the address 426 matches, the thread ID 424 matches, and any bit in the load mask has a match in the store mask. For entries with address overlap, the CAM will also check for full or partial matches. A full match occurs when each bit in the load mask has a corresponding bit in the store mask. Otherwise, the match is partial.

As stated earlier, a processor core 102 comprising a store queue 400 may be configured to perform dynamic multi-threading. It may not be desirable to instantiate on-chip a separate store queue 400 for each thread due to on-chip real estate constraints. Also, a single store queue 400 divided evenly among the maximum number of supported threads, wherein the subdivisions incorporate static allocation, may be inefficient. For example, if processor core 102 is configured to concurrently execute 8 threads and store queue 400 has 64 total entries (or 64 entries 412 and 64 entries 442), then, in one embodiment, 8 store queue entries support each thread. However, the 8 entries in this example for thread 0 may not be fully utilized or may not be utilized at all, as thread 0 may not be scheduled with work. Thread 1, on the other hand, may be utilizing all 8 of its store buffer entries and may need more in order to not experience stalls. Therefore, it may be more efficient and provide higher performance to use dynamic allocation of the store queue entries versus static allocation.

In addition, for the given example, a less number of entries may be used in order to reduce consumption of on-chip real estate, but still provide sufficient performance, such as 64 entries. A reorder buffer (ROB) may have 128 entries, but typically, software applications do not have one quarter of the instructions be memory reference operations such as load and store instructions. However, a cache miss may occur during a write-out of data to memory for a particular thread. Therefore, having a store queue less than the size of a ROB, but also greater than the size of one quarter of the ROB size due to cache misses may be more than sufficient. Simulations may be used to fine-tune the size of the single multi-threaded store queue. A design tradeoff with dynamic allocation of store queue entries is that entries do not provide an indication of an ordering among the store instructions of a same corresponding thread.

Figure 5:
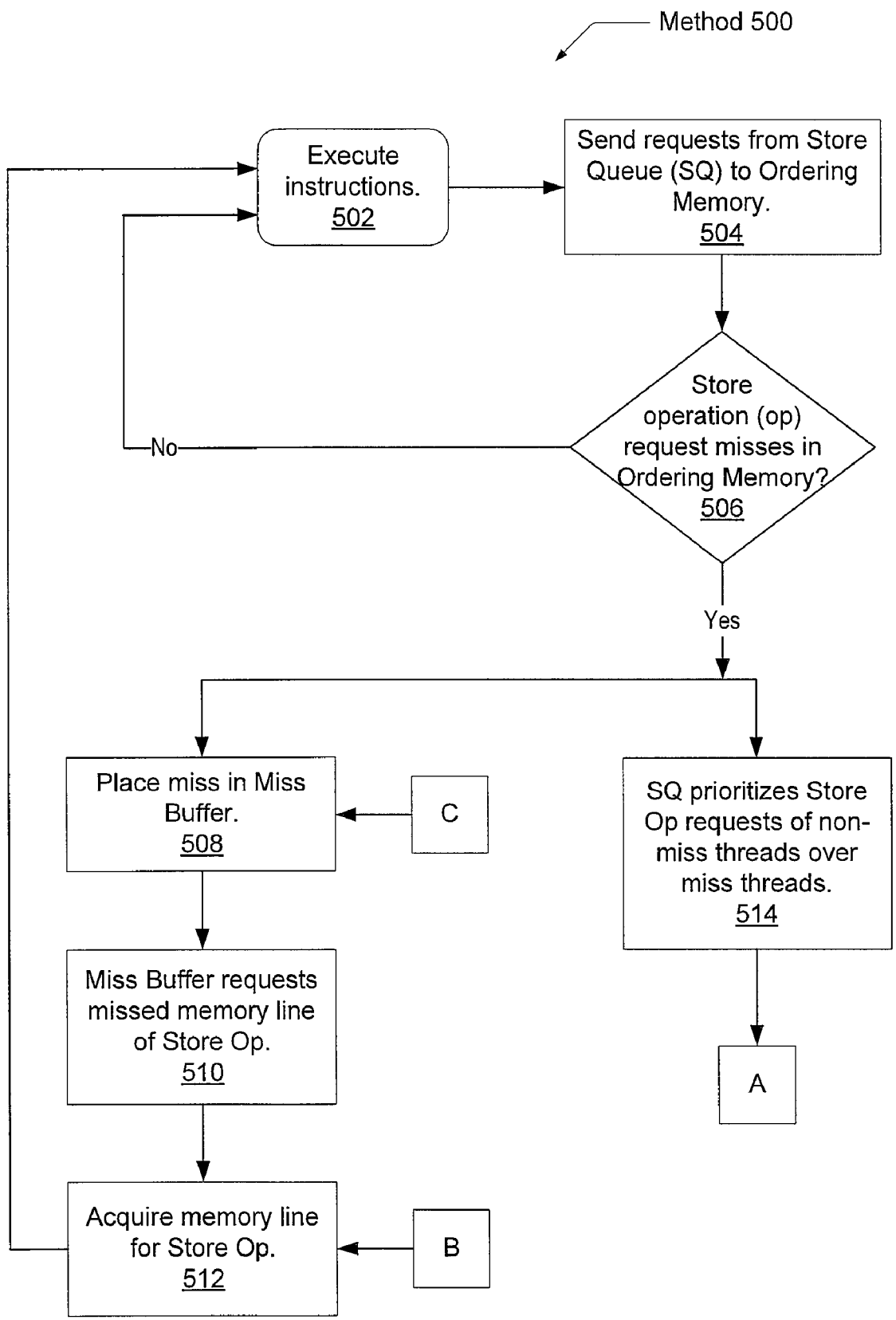
FIG. 5 is a generalized flow diagram illustrating one embodiment of a method for efficient handling of store misses corresponding to multiple threads.

Referring now to FIG. 5, one embodiment of a method 500 for efficient handling of store misses corresponding to multiple threads is illustrated. The components embodied in the computer system described above may generally operate in accordance with method 500. For purposes of discussion, the steps in this embodiment are shown in sequential order. However, some steps may occur in a different order than shown, some steps may be performed concurrently, some steps may be combined with other steps, and some steps may be absent in another embodiment.

A processor core 102 may be executing instructions of one or more software applications in block 502. In one embodiment, core 102 may be configured to perform dynamic multithreading. When a store instruction, or operation, obtains its corresponding data and is ready for instruction commit, or retirement, the store instruction may be dynamically allocated an entry in a store queue 400. Many methods for choosing a particular available entry in the store queue 400 are known by those skilled in the art, and each method is possible and contemplated.

If a non-empty thread is chosen, such as by an arbiter, to have data corresponding to committed store instructions be sent in-order to an ordering memory subsystem 330, then the first entry of the in-order chain of store instructions of the chosen thread is determined. In block 504, the entries of this in-order chain may be sent to ordering memory subsystem 330 in a pipeline fashion. Each entry may be sent to a write-through L1 cache in addition to a cache memory 332, which may be a corresponding L2 cache. An arbiter may determine a ready thread to write-out data based upon a programming of priority levels, a simple sequential routine, or other. For a particular entry of a chosen thread in store queue 400, at least the status information 422, TID 424, and address 426 may be sent to both a write-through L1 cache and cache memory 332, an L2 cache, in order to locate a corresponding cache line to be modified in the memory subsystem 330.

If a cache miss occurs (conditional block 506), then in block 508, corresponding information, such as at least status information 422, TID 424, and address 426, may be stored in miss buffer 334. Also, during a miss to cache memory 332, an indication may be sent back to the store queue 400. Upon receiving this indication, the store queue 400 may record the pointer of the next store instruction to be sent corresponding to the particular chosen thread. Also, the store queue 400 may switch from a normal mode of operation to a lookahead mode of operation. In a lookahead mode of operation, for the chosen thread that experienced a miss to the cache memory 332, the store queue 400 continues to send in-order store instructions to cache memory 332, but the store queue 400 converts these instructions to speculative prefetch isntructions before sending them to the cache memory 332. If the speculative prefetch instructions hit in the cache memory 332, which, as described above, is expected to be the common case, then these speculative prefetch instructions are discarded. In this situation these prefetch instructions do not consume entries in the miss buffer 334. If the prefetch instructions miss in the cache memory 334, then a process to acquire a corresponding requested cache line begins, which allows the latency of the subsequent acquisition to overlap the latency of the first acquisition.

In block 514, the store queue 400 may prioritize the threads running in normal mode over threads operating in lookahead mode. Such a scheme prioritizes performance of demand activity, or normal store instructions, above speculative activity, or speculative store instructions that determine if a requested cache line resides in cache memory 332 but does not modify any data upon a hit or a miss. Before continuing with a description of the actions of the store queue 400, further description of the actions of the miss buffer 334 is given.

In block 510, generally, once all dependencies are cleared for an entry in the miss buffer 334, the entry may enter a ready-to-request state. At this point the entry may begin arbitrating for access to the cache memory 332. Once an entry has successfully sent its request to the cache memory 332, the entry may transition to a pending state. The entry may remain in the pending state until a response from the cache memory 332 is received and the appropriate action, such as a cache fill, a bypass, or other has been taken in block 512. At this point, once this initial store instruction miss has been resolved, the store queue 400 may transition from operating in lookahead mode to operating in normal operating mode. The store queue 400 may resume sending store instructions to cache memory 332 from the point where the store queue 400 entered the lookahead mode. As will be further described shortly in method 550, if other store instructions queued in store queue 400 would have missed in cache memory 332, these instructions will likely have had the requested cache lines prefetched. This prefetching mechanism may reduce a significant portion or all of the latency to acquire the requested cache line. Control flow of method 500 then returns to block 502 from block 512.

Figure 6:
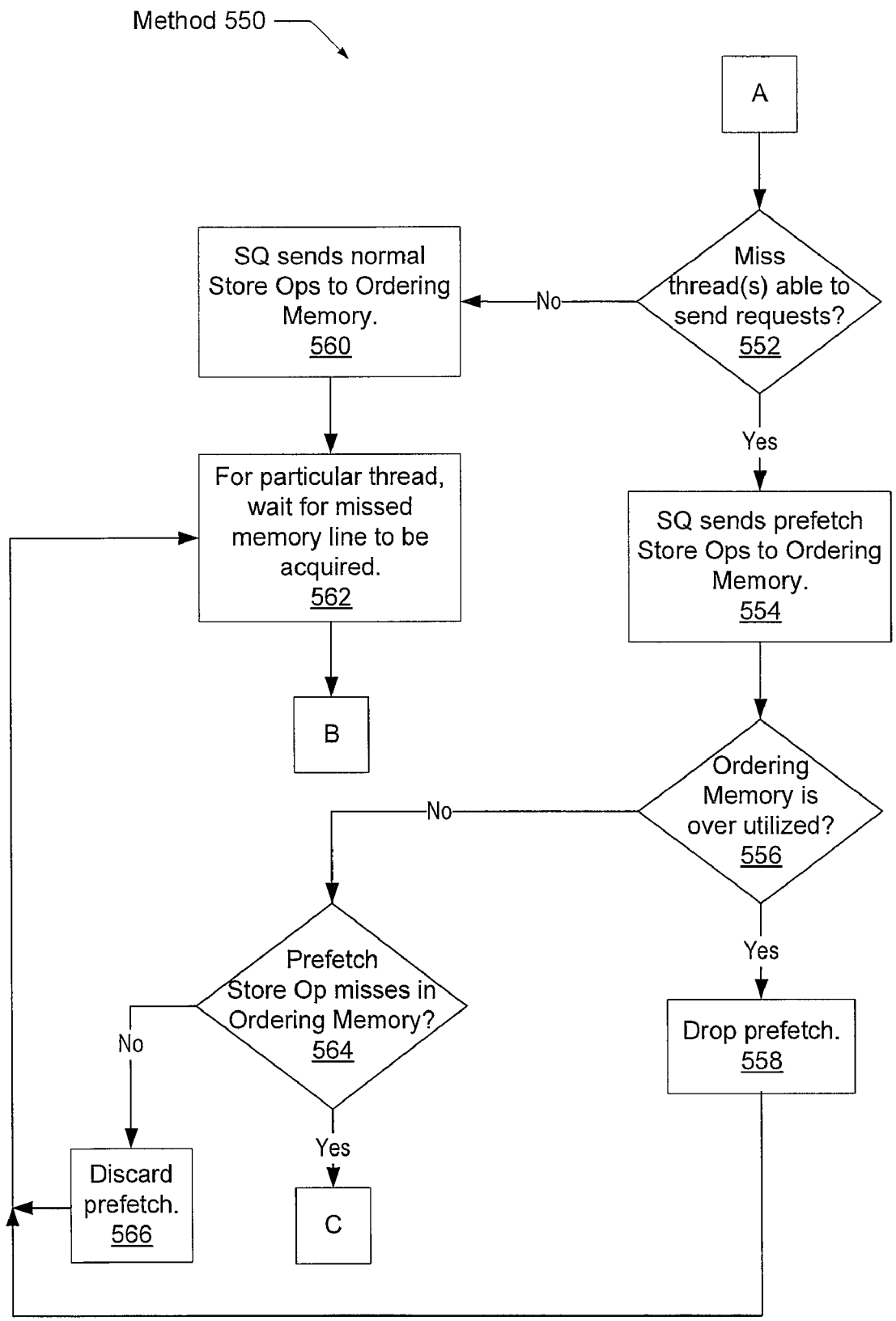
FIG. 6 is a generalized flow diagram illustrating one embodiment of a method for continuing efficient handling of store misses corresponding to multiple threads.

Returning to the actions of the store queue 400, control flow of method 500 moves to block A. Turning now to FIG. 6, one embodiment of a method 550 that continues method 500 for efficient handling of store misses corresponding to multiple threads is illustrated. The components embodied in the computer system described above may generally operate in accordance with method 550. For purposes of discussion, the steps in this embodiment are shown in sequential order. However, some steps may occur in a different order than shown, some steps may be performed concurrently, some steps may be combined with other steps, and some steps may be absent in another embodiment.

As stated above regarding block 514 of method 500, the store queue 400 may prioritize the threads running in normal mode over threads operating in lookahead mode. If a thread operating in lookahead mode is not permitted to send speculative prefetch store instructions to the cache memory 332 (conditional block 552), which is a global ordering point for a memory model, then in block 560, the store queue 400 continues to send normal store instruction requests of threads operating in normal mode. In block 562, the thread or threads that experienced a cache miss, which are operating in lookahead mode, have an entry in the miss buffer 334 that continues to wait for the requested cache line to be acquired. Control flow of method 550 then moves to block B.

If a thread operating in lookahead mode is permitted to send speculative prefetch store instructions to the cache memory 332 (conditional block 552), then in block 554, the store queue 400 sends these speculative instructions to the cache memory 332. If the cache memory is over-utilized (conditional block 556), which may be measured by the corresponding miss buffer 334 being above a predetermined high water mark or by other means, then in block 558, the cache memory 332 may drop the speculative prefetch instruction altogether. In one embodiment, a predetermined high water mark for the miss buffer 334 may include the miss buffer 334 has filled three-fourths of its total entries.

If the cache memory is not over-utilized (conditional block 556), then the speculative prefetch instruction may access cache memory 332. If the speculative prefetch store instruction hits in cache memory 332 (conditional block 564), which is expected to be the common case, then in block 566, the speculative prefetch store instruction is discarded. The requested cache line for this speculative prefetch store instruction resides in cache memory 332. Therefore, at a later time, regarding the same thread, when the normal store instruction that missed earlier does acquire its requested cache line, it is known that it is highly likely the subsequent store instruction that was the previous speculative prefetch store instruction will hit in cache memory 332. In various embodiments, prefetch hitting may update the LRU state (or similar cache status) to increase the likelihood of a later access hitting in the cache.

If the speculative prefetch store instruction misses in cache memory 332 (conditional block 564), then control flow of method 550 moves to block C and the speculative prefetch store instruction is placed in the miss buffer 334. Now the overall latency for acquiring requested cache lines for the first store instruction and this subsequent store instruction, wherein both store instructions missed in cache memory 332, has been reduced. The reduction is generated from the fact that the subsequent requested cache line acquisition partially overlaps with the first requested cache line acquisition.

As seen above regarding method 500 and method 550, regarding a case wherein a store instruction from one thread may miss, but the other threads do not miss, the store instructions from the other threads may not need to be ordered behind the store instruction of the miss thread. Therefore, these store instructions may be executed as quickly as possible. A problem of filling the miss buffer 334 and subsequently preventing all other threads from doing useful work is avoided by prioritizing normal mode over lookahead mode and by maintaining a predetermined high water mark of the miss buffer 334. Therefore, a balance may be found between prefetching for later store instructions, which may be critical to performance when running a small number of threads, and fetching for store instructions of other threads, which may be critical to performance when running a larger number of threads.

Although both the sending of store instructions from the store queue 400 and requests from entries in the miss buffer 334 regarding methods 500 and 550 are both described as occurring for one entry at one time, it is contemplated that the action and determinations performed may occur for two or more entries at a time. The actual number of entries may be determined by available on-chip real estate for parallel buses, circuit characteristics such as the number of CAM ports to use per cell of a store queue based upon capacitive loading and signal timing, and microarchitecture reasons.

It is noted that the above-described embodiments may comprise software. In such an embodiment, the program instructions that implement the methods and/or mechanisms may be conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computing system comprising:
   a store queue comprising a plurality of queue entries, wherein each queue entry is configured to store data for a committed store instruction; and
   a cache coupled to the store queue configured to convey information corresponding to a cache miss;
   wherein in response to a cache miss corresponding to a first committed store instruction, the store queue is configured to convey data to the cache that corresponds to a second committed store instruction, wherein the second committed store instruction follows the first committed store instruction in program order.

2. The computing system as recited in claim 1, wherein in response to the second committed store instruction missing in the cache, the cache is further configured to convey information corresponding to a cache miss of the second committed store instruction.

3. The computing system as recited in claim 2, wherein a miss in the cache comprises at least one of the following: a cache line corresponding to a request does not reside in the cache and a cache line corresponding to a request does reside in the cache with a cache coherency state other than an exclusive state.

4. The computing system as recited in claim 3, wherein the cache is further configured to drop the data received from the store queue that corresponds to the second committed store instruction, in response to determining at least one of the following: the cache is over-utilized, and the received data of the second committed store instruction hits in the cache.

5. The computing system as recited in claim 2, wherein the store queue is further configured to prioritize conveying data corresponding to threads that do not have a cache miss over conveying data corresponding to threads that do have a cache miss.

6. The computing system as recited in claim 2, further comprising a miss buffer comprising a plurality of buffer entries coupled to the cache, wherein the miss buffer is configured to store at least one of the following: a cache miss request of a non-speculative store instruction and a cache miss request of a speculative prefetch instruction.

7. The computing system as recited in claim 4, wherein said determining the cache is over-utilized comprises detecting three-quarters of the plurality of buffer entries correspond to cache miss requests.

8. The computing system as recited in claim 1, wherein responsive to resolving the first committed store instruction that missed in the cache, the store queue is further configured to convey to the cache a second entry of the plurality of queue entries.

9. A method comprising:
   storing data for a committed store instruction;
   conveying information corresponding to a cache miss from a cache; and
   in response to a cache miss corresponding to a first committed store instruction, the store queue conveying data to the cache that corresponds to a second committed store instruction, wherein the second committed store instruction follows the first committed store instruction in program order.

10. The method as recited in claim 9, wherein in response to the second committed store instruction missing in the cache, the method further comprises conveying information corresponding to a cache miss of the second committed store instruction.

11. The method as recited in claim 10, wherein a miss in the cache comprises at least one of the following: a cache line corresponding to a request does not reside in the cache and a cache line corresponding to a request does reside in the cache with a cache coherency state other than an exclusive state.

12. The method as recited in claim 11, further comprising the cache dropping the data received from the store queue that corresponds to the second committed store instruction, in response to determining at least one of the following: the cache is over-utilized, and the received data of the second committed store instruction hits in the cache.

13. The method as recited in claim 10, further comprising the store queue prioritizing conveying data corresponding to threads that do not have a cache miss over conveying data corresponding to threads that do have a cache miss.

14. The method as recited in claim 10, further comprising storing in a miss buffer at least one of the following: a cache miss request of a non-speculative store instruction and a cache miss request of a speculative prefetch instruction; the miss buffer comprising a plurality of buffer entries and being coupled to the cache.

15. The method as recited in claim 14, wherein said determining the cache is over-utilized comprises detecting three-quarters of the plurality of buffer entries correspond to cache miss requests.

16. The method as recited in claim 14, further comprising, conveying to the cache a second entry of a plurality of queue entries as a non-speculative store instruction, responsive to the first committed store instruction that missed in the cache being resolved.

17. A computer readable storage medium storing program instructions operable to efficiently handle of store misses corresponding to multiple threads, wherein the program instructions are executable to:
   store data for a committed store instruction;
   convey information corresponding to a cache miss from a cache; and
   in response to a cache miss corresponding to a first committed store instruction, causing the store queue to convey data to the cache that corresponds to a second committed store instruction, wherein the second committed store instruction follows the first committed store instruction in program order.

18. The storage medium as recited in claim 17, wherein in response to the second committed store instruction missing in the cache, the program instructions are further executable to convey information corresponding to a cache miss of the second committed store instruction.

19. The storage medium as recited in claim 18, wherein a miss in the cache comprises at least one of the following: a cache line corresponding to a request does not reside in the cache and a cache line corresponding to a request does reside in the cache with a cache coherency state other than an exclusive state.

20. The storage medium as recited in claim 19, wherein the program instructions are further executable to drop the data received from the store queue that corresponds to the second committed store instruction, in response to determining at least one of the following: the cache is over-utilized, and the received data of the second committed store instruction hits in the cache.

* * * * *